(12) United States Patent
Eliassi et al.

(10) Patent No.: US 9,671,237 B1
(45) Date of Patent: Jun. 6, 2017

(54) OPTIMIZED GENERATION OF NAVIGATION INSTRUCTIONS BASED ON COMPUTED PARKING PROBABILITY VALUES

(71) Applicant: SAP SE, Walldorf (DE)

(72) Inventors: Isaac Eliassi, Raanana (IL); Ahmad Haj Ali, Raanana (IL); Anna Gurayevskaya, Raanana (IL); Avi Rokach, Raanana (IL); Itzhak Shoshan, Raanana (IL); Matan Mizrahi, Raanana (IL); Ran Bittmann, Raanana (IL); Yan Vulich, Raanana (IL)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 14/942,897

(22) Filed: Nov. 16, 2015

(51) Int. Cl.
    *G01C 21/34* (2006.01)

(52) U.S. Cl.
    CPC .................... *G01C 21/34* (2013.01)

(58) Field of Classification Search
    CPC ...................................................... G01C 21/34
    See application file for complete search history.

(56) References Cited

U.S. PATENT DOCUMENTS

| 8,655,587 | B2 | 2/2014 | Kandal |
| 2004/0032342 | A1 | 2/2004 | Dunning |
| 2004/0167712 | A1 | 8/2004 | Plutowski |
| 2006/0116818 | A1* | 6/2006 | Chao .................. G01C 21/3415 |
| | | | 701/431 |
| 2006/0250278 | A1 | 11/2006 | Tillotson et al. |
| 2008/0048885 | A1 | 2/2008 | Quinn |
| 2011/0140922 | A1* | 6/2011 | Levy ...................... G08G 1/144 |
| | | | 340/932.2 |

(Continued)

FOREIGN PATENT DOCUMENTS

| EP | 2043071 A2 | 4/2009 |
| EP | 2447927 B1 | 9/2013 |

(Continued)

OTHER PUBLICATIONS

Retrieved from: https://web.archive.org/web/20150528070759/ http://www.parking-polly.com/en/; on Sep. 28, 2016; 2 pages.

(Continued)

*Primary Examiner* — Tuan C. To

(57) ABSTRACT

A number of parking segments is defined as a plurality of areas for street parking. A request for parking within the plurality of parking segments is received that defines parking constraints. The request is for optimize navigation to search for a free parking spot. Parking segments that comply with the parking constraints are determined. Current values for probabilities to park for the parking segments are determined based on evaluation of collected data for parking events. The data may include both traffic data and data related to defined features that are associated with determining of probability values. A route for traversing the parking segments is determined. The route defines an optimized order for traversing according to the determined current value for the probabilities to park. Navigation instructions are provided for the determined optimized route in response to the received request.

18 Claims, 9 Drawing Sheets

(56) References Cited

U.S. PATENT DOCUMENTS

| | | | |
|---|---|---|---|
| 2012/0161984 A1* | 6/2012 | Amir | G01C 21/3685 340/932.2 |
| 2014/0214319 A1* | 7/2014 | Vucetic | G01C 21/3407 701/533 |
| 2014/0278031 A1* | 9/2014 | Scofield | G08G 1/00 701/118 |
| 2014/0350853 A1* | 11/2014 | Proux | G01C 21/34 701/533 |
| 2015/0009047 A1* | 1/2015 | Ashkenazi | G08G 1/144 340/932.2 |
| 2015/0134244 A1* | 5/2015 | Hershey | G01C 21/3617 701/489 |
| 2015/0241230 A1* | 8/2015 | Davidson | G01C 21/34 701/533 |
| 2015/0269624 A1* | 9/2015 | Cheng | G06Q 30/0267 705/14.58 |
| 2015/0279213 A1* | 10/2015 | Balter | G08G 1/144 705/13 |
| 2015/0344028 A1* | 12/2015 | Gieseke | B60W 30/00 701/1 |
| 2015/0371541 A1* | 12/2015 | Korman | G08G 1/147 340/932.2 |
| 2016/0061618 A1* | 3/2016 | Benenson | G01C 21/3453 701/428 |
| 2016/0252350 A1* | 9/2016 | Wharton | H04W 4/02 701/25 |
| 2016/0375766 A1* | 12/2016 | Konet | B60K 35/00 348/148 |

FOREIGN PATENT DOCUMENTS

| | | | | |
|---|---|---|---|---|
| FR | EP 2587220 A1 * | 5/2013 | | G01C 21/3453 |
| JP | 2013214280 A * | 10/2013 | | G08G 1/0112 |
| WO | WO2010081545 A1 | 7/2010 | | |

OTHER PUBLICATIONS

Retrieved from: https://web.archive.org/web/20150512070341/http://www.parking-polly.com/en/faq; on Sep. 28, 2016; 3 pages.

Bo Xu et al; Real-time Street Parking Availability Estimation; Proceedings of the 2013 IEEE 14th International Conference on Mobile Data Management—vol. 01; pp. 16-25; (http://dl.acm.org/citation.cfm?id=2510013).

Jing Liu; Identification of Vehicle Parking Using Data From Vehicle Sensor Network; US Utility Application; U.S. Appl. No. 14/681,122, filed Apr. 8, 2015; pp. 62.

International Search Report for International Application No. PCT\EP2009\050375; pp. 3, mailed Apr. 6, 2009.

* cited by examiner

OPTIMIZED GENERATION OF NAVIGATION INSTRUCTIONS BASED ON COMPUTED PARKING PROBABILITY VALUES

FIELD

The field generally relates to navigation systems and data processing.

BACKGROUND

Navigation systems aid users in navigation on streets, roads, highways, in-door and out-door areas, etc. Navigation systems offer route generation based on different user criteria, such as time, distance, fuel consumption, etc. A navigation application is associated with maps, which may be displayed on a user interface in a human readable format via text or in a visual graphical format. Based on a received user's request for navigation, the navigation application may provide on the user interface a route on a map that satisfies the request. The navigation application may determine a vehicle's location via sensors, maps, or other external sources. The navigation application may communicate with a GPS module to determine the location of the vehicle while changing vehicle's position. Navigation instructions are provided by the navigation application in different forms. For example, the instructions may be suggested as a path drawn on a visualized map, or may be provided as speech instructed directions that correspond to the user's behavior while changing position.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for determining optimized parking routes based on probability to park are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
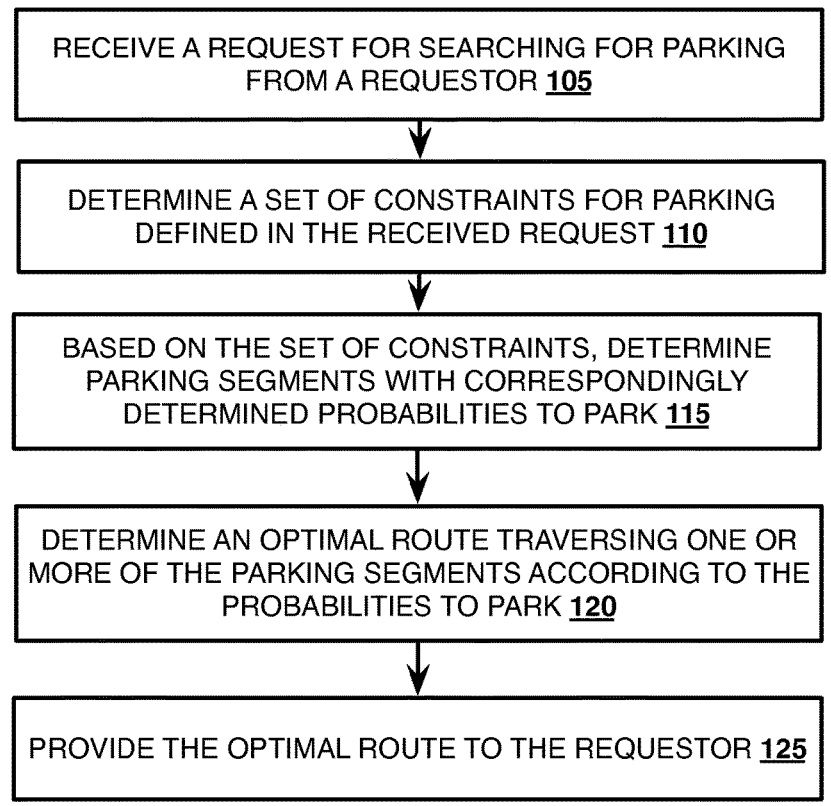
FIG. 1 is a flow diagram illustrating a process for providing an optimized parking route for navigation when searching for parking, according to one embodiment.

FIG. 1 is a flow diagram illustrating a process 100 for providing an optimized parking route for navigation when searching for parking, according to one embodiment. At 105, a request for searching for parking is received from a requestor. The requestor may communicate with a navigation application. The requestor may define and send the request through a user interface (UI) of the navigation application. The navigation application may be a mobile application accessed by the requestor from a mobile device, such as a mobile phone, tablet, portable device, etc. The received request at 105 may define constraints for parking. The request may be for directions through a route with maximum probability to find a parking spot to park at. The request may be associated with searching for available street parking options.

For example, vehicle drivers usually request instructions to easily find specific destinations, such as restaurants, tourist attractions, shops, addresses of homes, or other points of interest. Navigation applications may assist with instructions towards the specific destinations. When the destination is approached, a user of a navigation application, e.g., a car driver, may look for existing parking options, such as organized parking lots, or available street areas for parking. In different districts there are different rules for street parking. For example, different time durations for parking, different prices, etc. If the user is looking for available street parking options, there is an assumption that there is a higher chance to find a free spot in a larger parking segment, compared to a smaller one. Usually, users search for parking spots based on their personal assumptions of the probability to find spots that comply with their requirements. However, searching for a free parking spot on a street in an area unknown to the user, may be difficult. Or even for places that are familiar to the user, it may be difficult to distinguish whether there is a higher chance that one may find a free parking spot in one parking segment compared to another.

At 110, a set of constraints for parking is determined from the received request. The request may define a targeted area for parking or a specified destination point, constraints on a cost for parking, allowable duration for parking, etc. The request is for optimized navigation on road infrastructure to increase the probability to find a free parking spot within available street parking options. Based on the determined set of constraints, parking segments that comply with the request are identified. A parking segment may be a predefined area on a street defined on a map that is allocated for parking. A street segment with the same parking properties, such as driving directions, parking costs, and parking rules (e.g. maximum parking time) may be defined as a parking segment. At 115, the parking segments are determined together with correspondingly determined probabilities to park. A value for a probability to park associated with a parking segment is a value that reflects evaluated observation over parking behavior while searching to find a free parking spot within the parking segments. The value for the probability to park may be based on observation of the parking spot where parking is accomplished. Parking behavior may be associated with results of parking events when a user is navigated between a number of parking segments. For example, when a user is navigated to one parking segment, the result of the parking event associated with the parking segment, is the outcome of parking—parked or not parked. In one embodiment, the probabilities to park associated with the parking segments may be predetermined as current values that may be used for calculating an optimal route to maximize probability. In one embodiment, values for the probabilities to park may be dynamically computed based on existing data for past parking events defining parking behavior associated with the parking segments.

The parking segments may be selected from a number of parking segments defined, for example, on maps utilized by the navigation application that received the request. A map may include representations of streets within an earth area, together with identification of street directions and traffic regulations. The number of parking segments may have different characteristics, such as location parameters, numbers of parking spots, prices for parking, allowable durations for parking, etc. Further, parking segments may have different regulations for parking. One parking segment may define spots for parking on both sides of a street, and another parking segment may define spots for parking only on one of the sides of a street. The selected parking segments comply with the set of constraints from the received request. For example, the parking segments are with an acceptable proximity to a destination point, e.g., defined with the received request for searching for parking.

At 120, an optimal route traversing the parking segments according to the determined probabilities to park is determined. The optimal route traverses one by one the parking segments in an optimized order based on the probabilities to park defined correspondingly to the parking segments. A probability to park for a parking segment is a probability measure represented with a value in the range of 0 to 1 that is associate with likelihood to find a free parking spot in that parking segment. For example, a determined probability to park in a larger parking segment (e.g., with more than 20 parking spots) may be higher than in a smaller parking segment (e.g., with fewer than 5 parking spots). The determination of the probability values may be based on data about past parking events related to the different parking segments. The determination of a probability to park in a parking segment may be associated with different factors, such as a size of the parking segment; a location; a number of parking spots; proximity to public facilities, administrative and event centers; etc. Relation between such factors and a probability values may be determined by utilizing statistical learning methods over training data from past parking events.

At 125, the determined optimal route is provided to the requestor. The optimal route may be displayed on the UI of the navigation application, used by the requestor. The optimal route is provided as a graph connecting parking segments through defined streets and/or roads on a map. The graph may include a parking segment more than once, and there may be cycles. The optimal route may follow traffic regulations defined for an area comprising the streets associated with the defined parking segments.

Figure 2A:
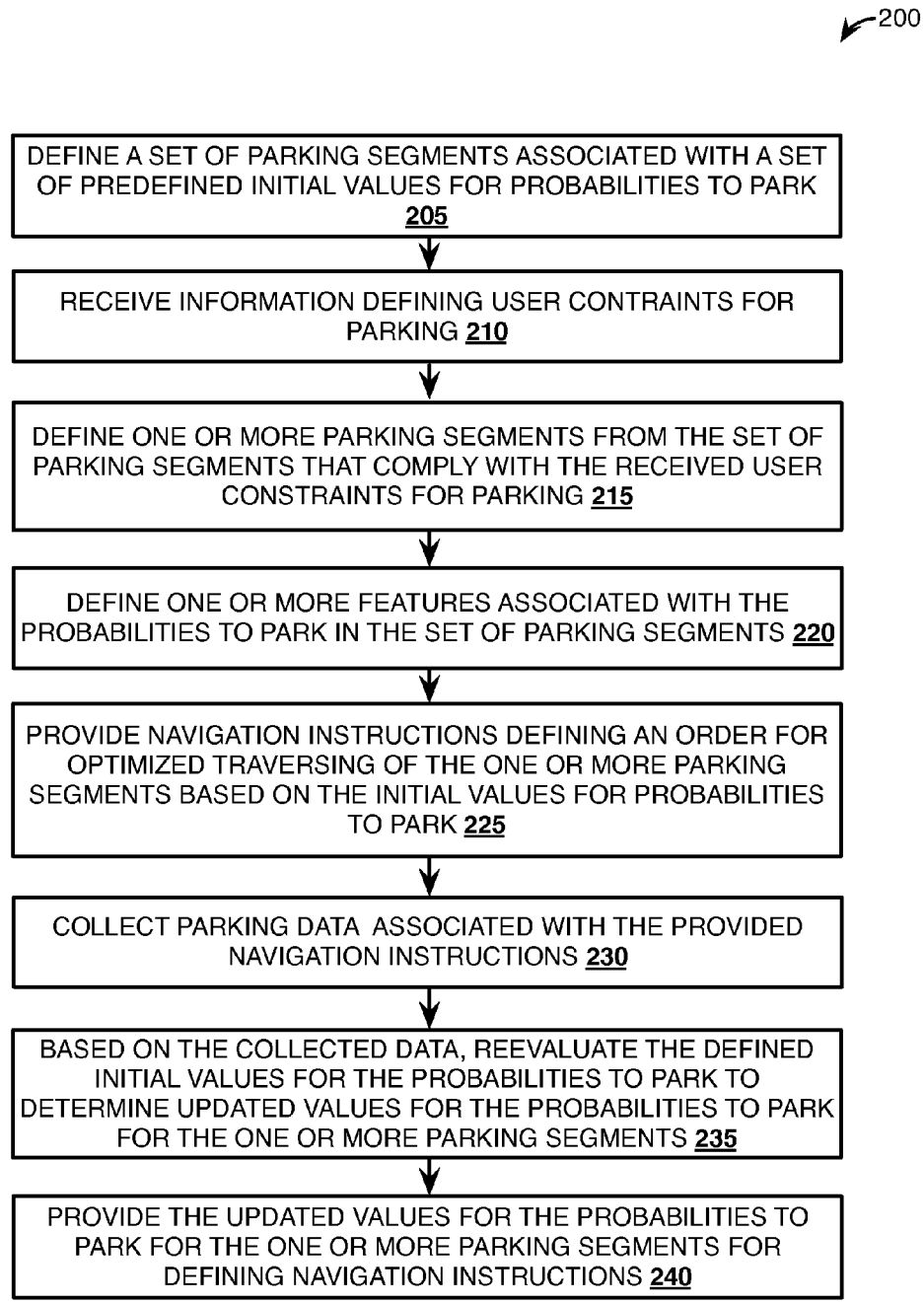
FIG. 2A is a flow diagram illustrating a process for determining current values for probabilities to park associated with defined parking segments based on collected data for parking events, according to one embodiment.

FIG. 2A is a flow diagram illustrating a process 200 for determining current values for probabilities to park associated with defined parking segments based on collected data for parking events, according to one embodiment. At 205, a set of parking segments are defined together with a corresponding set of predefined initial values for probabilities to park. The set of parking segments may be such as the set of parking segments discussed in relation to FIG. 1. The set of current values for the set of parking segments may correspond to the discussed determined probabilities to park. The set of parking segments may be defined on a map comprising definitions of road and points of interest representing within a defined area, such as the area of a given city, or a particular part of a city, e.g. a neighborhood, city center, etc. The defined road may be streets, boulevards, highways, bridges, and/or other road infrastructure that allows driving.

In one embodiment, the initially defined set of initial values may be arbitrary values. The set of initial values for the probabilities to park may be defined as values selected from a limited finite number of values. For example, the limited finite number of values may define a set of four values, such as—0; 0,1; 0,5; and 1. The selection of a value from the limited finite number of values may be based on externally collected data providing information about rough estimations of the probability to park in the set of parking segments. The provided information for the rough estimations may not correspond exactly to the defined limited finite number of values, but the rough estimations may be rounded up to values from a limited finite number of values. In addition, if there is no information about a rough estimation for a probability value for probability to park in a given parking segment, the initial values for the probability to park may be set to a default value for example 0,5. In another embodiment, the set of initial values for probability to park may be determined based on a similar method compared to the method suggested herein with respect to determining current values for the probability to park for the set of parking segments.

At 210, information is received that defines user constraints for parking. The user constraints for parking may be related to a received request for searching for parking, such as the received request at 105, FIG. 1. At 215, one or more parking segments from the set of parking segments are defined. The one or more parking segments comply with the received user constraints for parking. For example, the one or more parking segments are within an acceptable proximity to a desired destination point, allow parking for a requested time frame, and have a parking price which is lower than a defined limit for parking costs. These are examples of constraints for parking and the determination of parking segments is not limited to the provided examples.

At 220, one or more features associated with defining values for probability to park in the set of parking segments are defined. The one or more features may include parking event features that are associated with characteristics of parking event while traversing a route through a set of parking segments. The features may include characteristics of a given parking segment related to a parking event. For example, if a feature may be related to whether a parking segment is near a point of public interest), time of the day, day of the year, weather conditions, existing nearby events, etc. The defined one or more features are associated with determining a current value for the probability to park in a parking segment. The definition of a feature may be related to an assumption that the feature reflects a probability values to park. For example, under sunny weather conditions, it may be observed that the probability to park may be higher, as fewer people are using cars and prefer walking or using public transportation. Such a hypothesis or statistical observation may be associated with the definition of a feature.

At 225, navigation instructions may be provided. The navigation instructions define an order for optimized traversing of the one or more parking segments (defined at 215), based on the initial values for probabilities to park defined correspondingly to the one or more parking segments. At 230, parking data are collected that is associated with the provided navigation instructions. The parking data may be collected from external sources providing information for parking events during traversing the optimized route according to the navigation instructions. A designated parking event may be associated with a parking segment that is traversed. The collected data include information for the parking events. For example, the collected data include parking results' data, event features' data, etc. The parking data comprise traffic data for the parking events associated with the traversed parking segments. The parking data further comprise additional data for the parking events associated with the one or more defined features. For example, parking segment X is traversed by a requestor while driving and following the navigation instructions. The parking event associated with the parking segment X may be associated with data about whether the requestor parked or not at that parking segment X; what was the time when he passed by or parked at the parking segment, what was the weather, was there a public event near by (such as a sports game), etc. The type of additional data that are collected for the parking event is determined based on the defined one or more features of probability to park, defined at 215.

At 235, based on the collected data, the predefined initial values for probabilities to park are reevaluated to determine updated values for probabilities to park for the traversed one or more parking segments. The collected parking data provide insight into patterns of parking with respect to different time of the day, weather conditions, location, and so forth. Based on the collected parking data, the initial values may be adjusted to reflect observed parking patterns. During the reevaluation of the current values of the probabilities to park, a machine learning algorithm may be applied that utilized the collected traffic data and the additional information as training data to perform calculations. In one embodiment, the reevaluated values for probabilities to park may not be values that are selected from the limited finite number of probability values. The reevaluated values for probabilities to park may be accurately computed probabilities quantified into a number within the range of 0 to 1, where 0 indicates impossibility and 1 indicates certainty. At 240, the updated values for the probabilities to park for the set of parking segments are provided for defining navigation instructions. The navigation instructions may be determined and provided to a navigation application. The navigation application may use the updated values for the probabilities to park as weights for the set of parking segments while defining an optimized parking route for traversing parking segments from the set. A parking segment with a higher value for a probability to park may be positioned at an earlier step of the provided route.

Figure 2B:
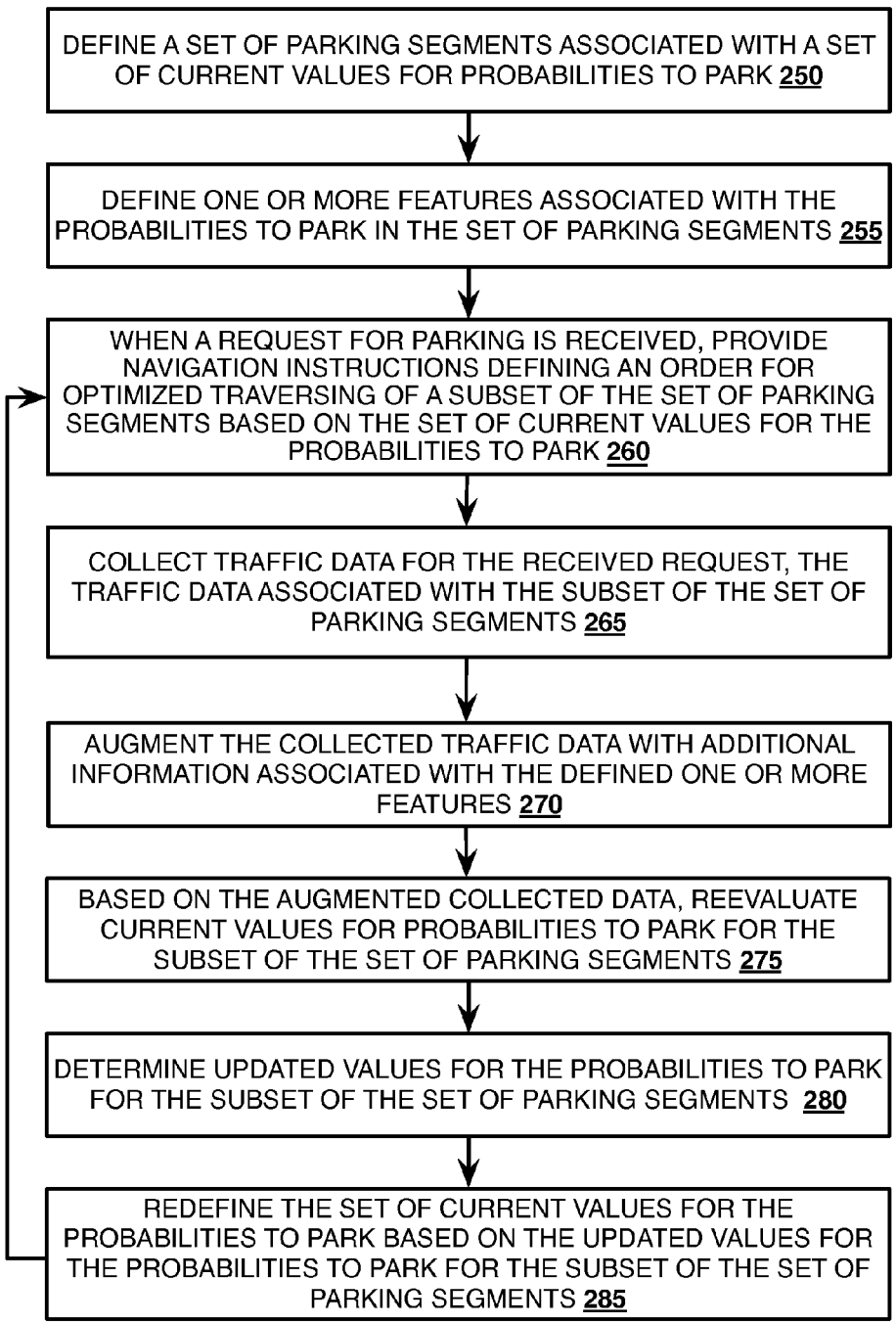
FIG. 2B is a flow diagram illustrating a process for iterative redetermination of current values for probabilities to park associated for parking segments based on collected parking event data, according to one embodiment.

FIG. 2B is a flow diagram illustrating a process 245 for iterative redetermination of current values for probabilities to park associated with parking segments, based on collected parking event data, according to one embodiment. At 250, a set of parking segments associated with a set of current values for probability to park is defined. The set of parking segments may be such as the discussed parking segments in relation to FIG. 1 and FIG. 2A. At 255, one or more features associated with the probabilities to park in the set of parking segments are defined. The definition of a feature of a parking event may be associated with a correlation between the feature and a parking result of the parking event. When a correlation between collected data associated with a feature and a parking result is observed, then the determination of an expected probability value for the probabilities to park may be affected.

At 260, when a request for parking is received, navigation instructions are provided. The navigation instructions define an order for optimized traversing of a subset of the set of parking segments based on the set of current values for the probabilities to park. Parking segments with higher current values for the probabilities to park are traversed with priority. The order for optimized traversing follows a decreasing order of the current values for the probabilities to park for the subset of the set of parking segments. At 265, traffic data are collected for the received request that is associated with the subset of the set of parking segments. Traffic data may be received from a navigation application that utilizes the provided navigation instructions at 260. The navigation application may provide the instructions to an end user who may change location based on the instructions while searching to find a free parking spot to park. Traffic data may define a set of parking results associated with the subset of parking segments that are traversed. For example, if the subset of the set of parking segments that is included in the navigation instructions comprises three parking segments, the collected traffic defines whether parking is accomplished or not at each of the parking segments. With respect to the example, parking may be accomplished at the second parking segment on a way of traversing the three parking segments. Then, the collected traffic data may indicate that there is no parking accomplished at the first and the second of the parking segments, and that parking is accomplished at the third parking segment. The indication of whether there is accomplished parking or not may be stored in the traffic data in form of a Boolean number value—0 and 1, for no parking and for accomplished parking respectively.

At 270, the collected traffic data are augmented with additional information associated with the defined one or more features. The additional information is for the parking events, for which traffic data are collected. These parking events are defined correspondingly for the subset of the set of parking segments that are traversed. The additional data may be collected from an external source that may provide information in relation to the defined features. For example, if one of the defined features is a weather conditions feature, then information about the weather conditions at the time of the parking event may be invoked from an external source. The external source may be a weather application or another weather data source. In a second example, if a feature is a time/date feature, then information about the exact time of the parking event may be collected. In the second example, if a parking event defined that there were no parking accomplished at a given parking segment, then the information about the exact time of the parking event may be the time of the day when a user of the navigation instructions reached or bypassed the parking segment without parking.

At 275, based on the augmented collected data, current values for probabilities to park defined for the subset of the set of parking segments are reevaluated. The reevaluation of the current values may be performed based on a machine-learning algorithm, such as Support Vector Regression (SVR) or Linear Regression (LR). These algorithms have a similar input and output prerequisites. For example, formula (1) represents an exemplary function signature for the SVR algorithm:

$$\text{SVR}(<\text{current PtP}>,<\text{Feature List}>,<\text{training data}>) \rightarrow <\text{New PtP}> \tag{1}$$

With the use of a machine learning algorithm and the collected augmented data, reevaluated values for the probabilities to park for the parking segments are determined. The <training data> as suggested in formula (1) may be such as data 400, presented below in relation to FIG. 4. The <New PtP> represented in formula (1) is a list of reevaluated probabilities to park corresponding to the parking segments, for which training data are collected.

At 280, updated values for the probabilities to park for the subset of the set of parking segments are determined. The updated values for the probabilities to park may be used when defining navigation instructions for optimized searching for a free parking spot within defined parking segments. The generated navigation instructions may be fed into a navigation application that may run on a mobile device used by an end user, such as a car driver. At 285, the set of current values for the probabilities to park are redefined to incorporate the updated values for the probabilities to park for the subset of the set of parking segments.

Figure 3:
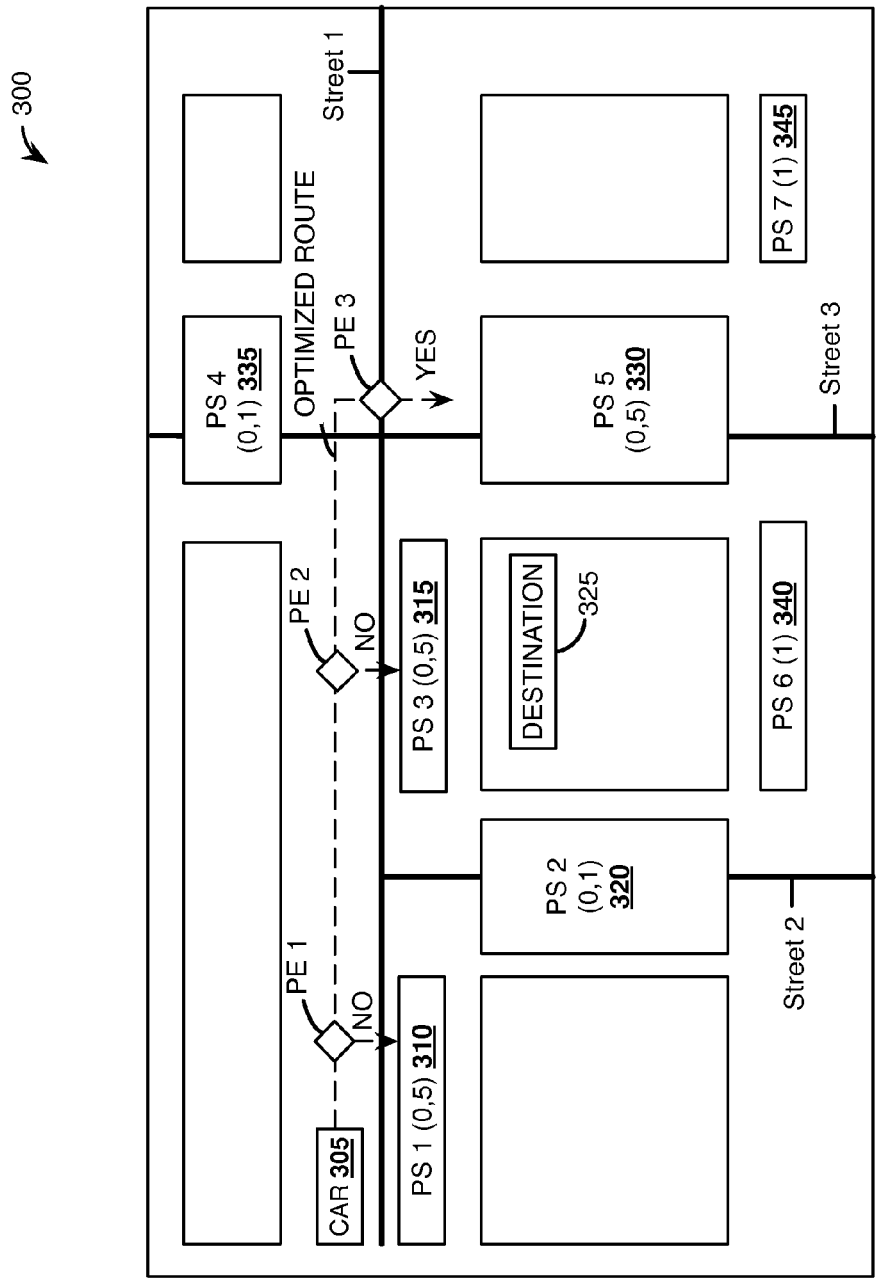
FIG. 3 is a block diagram illustrating a process for navigating when searching for parking based on a received request, according to one embodiment.

FIG. 3 is a block diagram illustrating a process 300 for navigating when searching for parking based on a received request, according to one embodiment. Car 305 may be navigated in response to the received request for searching a free parking spot in a parking segment within a set of parking segments. The received request may define that the search is for a parking spot within 200 meters from a destination 325 point and no more than 15 $ per hour for a parking fee. Car 305 is navigated towards parking segments close to the destination 325 point. Car 305 is moving along streets by following navigation instructions, for example, provided on a mobile device. The navigation instructions may be provided by a navigation application accessed by the mobile device. The navigation instructions may be generated by a route determining module that determines an optimal route for traversing parking segments. The definition of the optimal route may be based on determined values for probabilities to park associated with possible parking segments on the streets available for parking and the received parking constraints. Therefore, the navigation instructions may suggest a route that traverses parking segments that comply with prerequisites defined in the received request. Further, the route may be determined based on the proximity of a parking segment to a location of car 305 and a current value for probability to park associated to that parking segment.

In one embodiment, the determination of the values for the probabilities to park associated with parking segments may follow the described processes in relation to FIG. 1, FIG. 2A, and FIG. 2B. The navigation instructions may suggest a route starting at "PS 1" 310, then "PS 3" 315, then "PS 5" 330, then "PS 6" 340, etc. The navigation instructions may further navigate once again to "PS 3" 315, which may suggest passing "PS 2", which does not comply with user constraints. The parking segments that are included in the suggested route for optimized traversing are selected from a wider range of predefined parking segments. The selection is based on matching the received constraints for parking in the request, such as a price limit and distance from destination point. Constraints for parking may further include request for a time period that is to be allowed at the parking segment, or the parking fees, etc. A value for probability to park in a given parking segment may be a number between 0 and 1. The higher the value for the probability, the greater the chance that a free spot for parking may be found in that parking segment. Respectively, parking segments with higher probability to park may be traversed first. A set of parking segments that do not comply with user constrains may be given a probability value equal to "0", and the optimized route may be based on such probability values. If different user constraints are provided and a parking segment from the previously mentioned set complies with the different user constrains, then a different probability value may be defined for that parking segment. "PS 7" 345 is not included in the list of parking segments for traversing, as "PS 7" 345 does not comply with the defined constraints. Therefore, a probability value for "PS 7" 345 may be reduced from 1 (as defined initially for "PS 7") to 0. For example, "PS 7" 345 may be at a 300 meters distance from the destination 325, which is above a predefined distance limit. Further, "PS 2" 320 does not comply with the defined constraints. For example, "PS 2" 320 may be defined with a price for parking per hour that is higher than the defined constraint on the price with the request. The optimal route is determined according to an order of values for probabilities to park associated with the list of parking segments for traversing—"PS 1" 310, "PS 2" 320, PS 3" 315, "PS 4" 335, "PS 5" 330, "PS6" 340, and "PS 7" 345. The route is determined also in association with a received starting position of the navigated entity, such as car 305. Parking segment "PS 1" 310 is the first one on the optimal route that is within a closer proximity to car 305 compared to the rest of the parking segments from the list for traversing. Parking segment "PS 1" 310 has a defined value for probability to park equal to 0,5. The next parking segment from the list that is determined to be a second one for traversing is parking segment "PS 3" 315. "PS 3" 315 has a defined probability value for parking equal to 0,5. The third parking segment on the optimal route for traversing defined for car 305 is "PS 5" 330. "PS 5" 315 is selected as the third one on the route as it has a higher probability to find a free parking spot—0,5, compared to the probability value associated with "PS 4" 335—0,1 (0,5>0,1). 1

The process 300 suggests movement of car 305 between "PS 1" 310, "PS 3" 315, "PS 5" 330, "PS 6" 340, etc. For the parking segments defined in the list for traversing there are parking events defined. Traffic data are collected for the parking events, which defines whether car 305 had parked at that "PS 1" 310. The definition of a parking result for the parking event may be denoted with 0 or 1, as there are two cases—parked or did not park. Car 305 had not parked at "PS 1" 310 and "PS 3" 315. Car 305 parked at "PS 5" 330, which is the third traversed parking segment on the optimized route. Then collected traffic data for the third parking event may define that there is an accomplished parking and may be denoted with 1. The rest of the parking segments from the list for traversing are not traversed by car 305.

Figure 4:
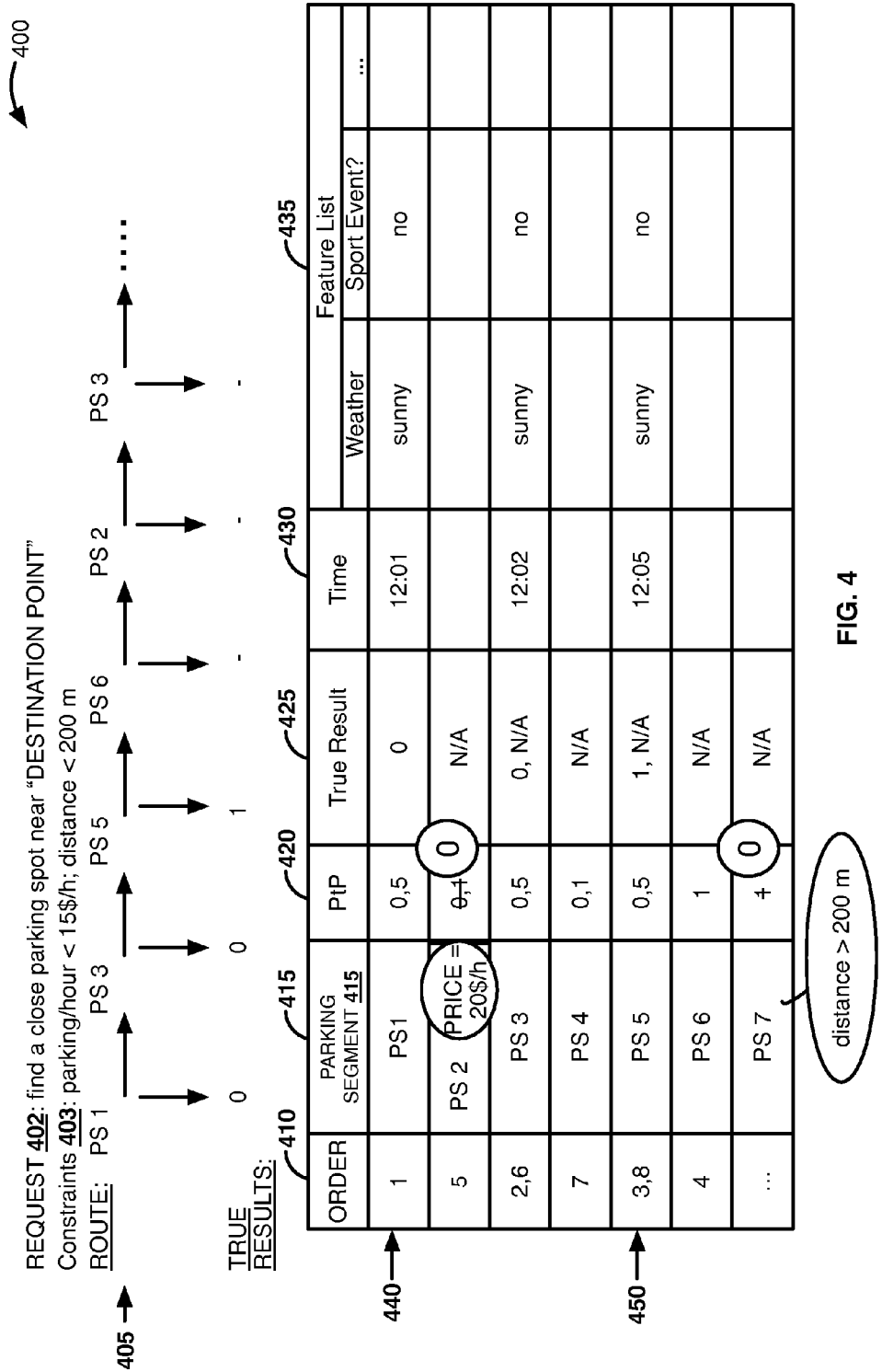
FIG. 4 is a block diagram illustrating data collected for reevaluation of current values for probabilities to park defined correspondingly for parking segments that are traversed while navigating on a route for parking, according to one embodiment.

FIG. 4 is a block diagram illustrating data 400 collected for reevaluation of current values for probabilities to park defined correspondingly for parking segments that are traversed while navigating on a route for parking, according to one embodiment. FIG. 4 represents data 400 from parking events associated with navigation instructions while searching for parking as discussed in relation to the example in FIG. 3. The collected data 400 may be stored in a table format. A request 402 is send for car 305, FIG. 3, which requests to find a close parking spot near "Destination Point"—the Destination 325 point, FIG. 3. The request 402 defines constraints 403 for parking, such a limitation on the price for parking per hour for a parking segment and a limitation on a distance between the parking segment and the destination point. The constraints 403 define that the price for parking per hour is about to be lower than 15 $ per hour and that the distance between the parking segment and the destination point is about to be smaller than 200 meters. A route 405 is suggested for car 305, FIG. 3, which defines an ordered list of parking segments that comply with the constraints 403. The route 405 is optimized according to current values defined for the probabilities to park for the parking segments. The current values used for determining route 405 may take into consideration the received constraints 403. Based on the constraints 403, a probability value for a parking segment that does not comply with the constraints 403 is reduced to 0. For example, the probability value for PS 2 is initially determined to be 0,1. As PS 2 has a higher price for parking, the probability value is corrected and set to 0. The optimized route 405 corresponds to the route that is described in relation to car 305 in FIG. 3. The route defines the following order—PS 1 (corresponding to "PS 1" 310, FIG. 3), PS 3 (corresponding to "PS 3" 315, FIG. 3), PS 5 (corresponding to "PS 5" 330, FIG. 3), PS 6 (corresponding to "PS 6" 340, FIG. 3), PS 2 (corresponding to "PS 2" 320, PS 3, and PS 4 (corresponding to "PS 4" 335, FIG. 3). The optimized route may suggest that a parking segment is traversed twice. In the current example for the to optimized route 405, PS 3 is suggested for traversing twice. For the parking segments from the route 405, a true result for a corresponding parking event is determined. The true result may be collected from a source providing information about parking behavior of car 305, FIG. 3. For example, the data may be collected from a navigation application used for navigating car 305. The true result is presented in column 425 within the data 400.

The collected data 400 are represented in a table that comprises a set of columns. Column 415 comprises the notations of the parking segments. For example, PS1 stands for the first parking segment as defined. The definition of a parking segment may include information about parking location, dimensions, prices, policy for parking, number of spaces, etc. The columns comprise an order column 410, which define an order number of a parking segment on the optimized route for traversing parking segments based on determined current values for probabilities to park. The current values for probabilities to park (PtP) that are used when determining the optimized route for traversing the parking segments are presented at column 420. The current values for PtP for parking segments that do not comply with constraints 403 are defined to be equal to 0. Column 425 includes collected data for the parking events associated with the optimized route. Column 425 includes values of 1 and 0, or "N/A, where "N/A" is set for parking segments, which are not traversed. In column 425, only one row may have the value of 1 denoting parking success at a parking event. Column 430 comprises data about the time of the parking event associated with a corresponding parking segment. The time data in column 430 provides information about the time of parking or the time when a parking segment is trespassed or bypassed. When a parking segment is not trespassed or bypassed, as it was at a later step in the optimized route that follows after a successful parking, then time data stored for that parking segment may be denoted as "N/A", which stands for not available. Further, at column block 435 other additional data are collected that is associated with the parking events. The data stored at column block 435 may be associated with defined event features, such as the defined one or more features at 220, FIG. 2A, and 255, FIG. 2B. The additional data collected stored at the column block 435 for the feature list may be collected from external sources, providing such type of information. For example, data about time of the events may be invoked from the navigation application, which is used for navigating car 305. The defined event features may be associated with determining values for probabilities to park. The features may include weather conditions, existence of sports events near by, etc.

For example, with respect to the traversed route 405 by car 305, record 440 stored collected traffic data and additional data associated with event features. Record 440 include data for the first parking event associated with the first traversed parking—PS 1 ("PS 1" 310, FIG. 3). The current value for the probability to park is 0,5, and as car 305 had not parked at that parking segment, the stored value for the true result is "0". The time of the parking event, namely, the time when car 305 passed by PS 1 is 12:01, and the weather are classified "sunny". The data about the weather conditions may be stored according to a preset list of options. For example, the weather conditions may be classified to sunny, cloudy, rainy, snowy, etc. Based on the defined classification, corresponding number values may be associated that may be later on used for reevaluating the current values for probabilities to park (PtP) for the parking segments stored at column 420. As there were no sports event scheduled near by PS 1, the value stored for column "Sport Event?" is equal to 0, as it is a Boolean value. Further, record 450 comprises data for a thirdly traversed parking segment—PS 5. The probability to park is 0,5, the true result associated with the parking event is "1", as the car had parked at that parking segment PS 5. The time of parking is 12:05, the observed weather conditions are classified as "sunny", and there were no sport event near by. The data 400 includes both traffic data for the parking events together with addition information that may extend the traffic data.

The data 400 may be used for an analysis over correlation between the collected data for the defined feature list 435 and the time 430 for the parking events and the true results, to predict values for the probabilities to park. Based on the data 400 and observed dependencies, a reevaluation of the determined current probabilities to park (PtP at column 420) may be performed. For example, a record in the data 400 may define that a successful parking happened at a given parking segment, which means that the true result is equal to "1" for that parking segment and for all the other parking segments the value for the true result is "0". Then the reevaluated value for the probability to park for a parking segment where the parking results is "1" may be higher compared to the reevaluated value for the probability to park in a parking segment that is trespassed or bypassed without parking. In one embodiment, through tracking data such as the data 400, users' behavior for parking in the parking segments is observed. The feature list 435 may be extended with additional features for which data may be collected and reevaluation of the values for the probabilities to park may be performed. The data 400 may be used to form a training data set that is provided as an input to a machine learning algorithm that revalued the PtP 420 data. In the training data set a record for each parking segment may comprise only numerical values that are corresponding to the collected data. Data for the weather conditions may be classified to categories. For example, weather conditions may be classified into 3 categories that are mapped to 3 numerical values, such as 1, 2, and 3. The training data set can be fed to a predefined machine learning algorithm.

Figure 5:
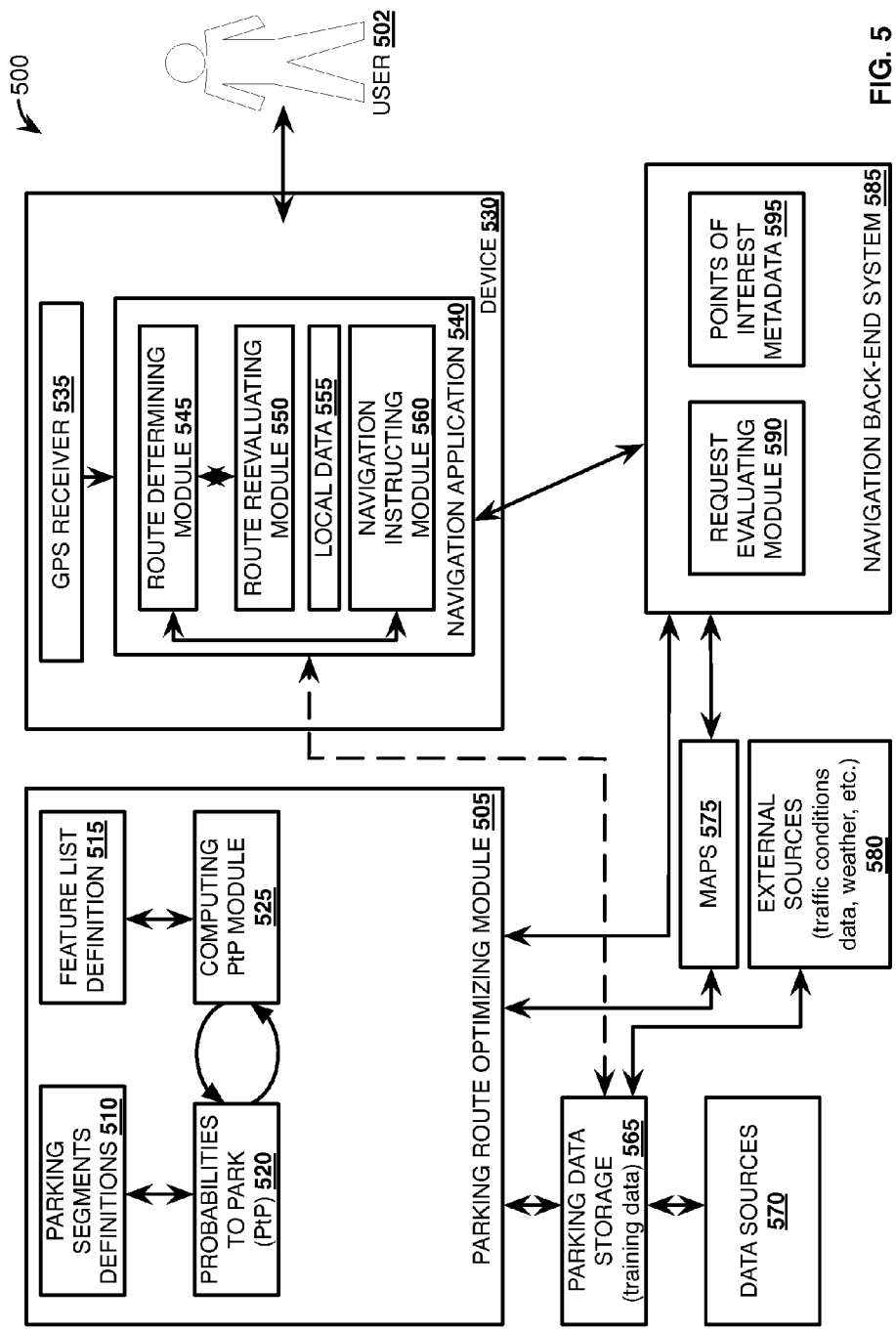
FIG. 5 is a block diagram illustrating a system for providing an optimized parking route for navigation when searching for parking, according to one embodiment.

FIG. 5 is a block diagram illustrating a system 500 for providing an optimized parking route for navigation when searching for parking, according to one embodiment. A user 502 uses a device 530, which may be a mobile device. The device 530 includes a Global Positioning System (GPS) receiver 535 module, which may accurately calculate geographical location of the device 530 by receiving information from GPS satellites. The GPS receiver 535 communicates with a navigation application 540 when the user 502 requests navigation while searching for parking. The navigation application 540 receives the request from the user 502 and determines user's constraints for parking. The constraints may be such as the suggested constraints at constraints 403, FIG. 4. And the request that is send by the user 502 may be such as request 402, FIG. 4.

The navigation application 540 includes a route determining module 545, a route reevaluation module 550, local data 555, and navigation instructing module 560. When the request from the user 502 is received from the navigation application 540, the route determining module 545 determines a route for traversing parking segments. The route determining module 545 communicates with a navigation back-end system 585 that comprises a request evaluating module 590 and points of interest metadata 595. The points of interest metadata 595 may define specific location on the maps 575 that are useful and/or are of public interest. For example, a point of interest may be a town hall, a church, a school, a business center, a university, a stadium, etc. The points of interest metadata 595 may include information about location coordinates and description of the locations. For example, a point of interest may be a sport stadium where a lot of sport events are hosted, which may have an impact on the availability for parking within near by parking segments. Such information about close proximity between parking segments and specific points of interest may be provided from the points of interest metadata module 595 to the request evaluating module 590. The request evaluating module 590 receives information about the request for searching for parking from the route determining module 545. The navigation back-end system 585 communicates with a parking route optimizing module 505 to determine an optimal route for traversing parking segments. The navigation back-end system 585 accesses data provided from maps 575. The maps 575 include information about geographic features of an area and possible orientation in an urban space. The maps 575 include information about streets (roads) and available areas for street parking. The request evaluating module 590 may filter parking segments from the set of parking segments by setting their probability value to 0. The determined parking segments comply with the received request by user 502. The determining of the parking segments that are relevant for the received request from user 502 may be based on defined user constraints that are transferred from the route determining module 545 to the request evaluating module 590. Then the request evaluating module 590 communicates with the parking route optimizing module 505 to request current values for probabilities to park for the determined parking segments.

In one embodiment, the optimal route is determined based on provided information for current values for probabilities to park for parking segments from the parking route optimizing module 505. The parking route optimizing module 505 comprises parking segments definitions 510 module, which correspond to existing available parking areas on streets defined on maps, such as maps 575. A set of parking segments may be defined in the parking segments definition 510 module. A parking segment may be such as the discussed parking segments in relation to the above presented figures and description. With respect to the example on FIG. 3, parking segments PS 1 and PS 3 are on one and the same street—"street 1". There is an option for car 305 to turn right after PS 1 and before PS 2, and there is an option to continue without changing selected direction towards destination 325 point. Based on the existing options, PS 1 and PS 3 cannot be defined as one parking segment and are divided according to the available option to switch on the right.

The parking segments definitions 510 are associated with probabilities to park 520. The PtP 520 module includes data for the currently calculated values for the probabilities to park associated with the parking segments defined in the parking segments definitions 510. The PtP 520 module is communicating with a computing PtP module 525. The computing PtP module 525 comprises logic for determining values for probabilities to park based on an evaluation of data collected for parking events resulting from navigation for parking. The computing PtP module 525 may perform evaluation over initially defined values for probabilities to park for the parking segments to determine updated values for probabilities to park. The evaluation of the initial values for the probabilities to park may be as discussed in relation to FIG. 2A. Additionally, the computing PtP module 525 may also reevaluate iteratively already computed updated probabilities to park on a regular basis. The reevaluation may be performed based on collected data, such as the data 400, FIG and as discussed in relation to FIG. 2B, for example. Collected data may be used as training data and provided to a selected machine learning algorithm for reevaluation of the probability values. The parking route optimizing module 505 includes also a feature list definition. The feature list definition comprises definition of the features that are determined to reflect computations of the probabilities to park. The feature list definitions may include definitions for a feature list such as the feature list 435, FIG. 4. The definitions of the features may be enhanced dynamically, which may reflect what kind of data are collected in relation to the parking events and respectively the computation of the values of the probabilities to park 520 by the computing module PtP module 525.

In one embodiment, the parking route optimizing module 505 feeds the navigation back-end system with information about determined current values for probabilities to park for a set of parking segments defined on the maps 575. Based on the consumed information about the current values for the probabilities to park from the parking route optimizing module 505, the requested evaluating module 590 may provide information to the route determining module 545 on the navigation application 540. The route determining module 545 on the navigation application 540 may determine an optimized route traversing the determined parking segments according to the current values for probabilities to park. The route determining module 545 communicates with the navigation instructing module 560 to generate navigation instructions for the determined optimized route. The navigation application 540 may also comprise local data 555 that stores information associated with received requests, provided navigation, pre-selected user preferences for navigation, or other specific details associated with that particular entity of the navigation application 540. The local data 555 may be used when determining the optimized route by the route determining module 545.

The navigation application 540 may further comprise a route reevaluating module 550 that may dynamically reevaluate the determined route by the route determining module 545 when additional information is provided. For example, if the GPS receiver 535 provides notification to the navigation application 540 that the location is changed, but not according the provided navigation instructions, then the optimal route may be reevaluated. A new route may be determined that corresponds to the changed location. In an embodiment, an optimal route may be reevaluated when a parking segment is traversed without parking. Then, a current value for the probability to park at the parking segment may be diminished, and a new set of local values for probabilities to park may be determined. A diminishing of the current value may be performed with a predefined index, e.g. 0,5. Based on the local values for the probabilities to park for the parking segments, the optimal route may be recalculated.

In one embodiment, the navigation application 540 may provided information about parking events associated with provided instructions for parking. The information may be provided to a parking data storage 565, where stored data may be treated as training data that may be fed into the parking route optimizing module 505 for reevaluation of the probabilities to park 520. The parking data storage 565 may store data similar to the suggested data 400 in relation to FIG. 4. The parking data storage 565 may also include data associated with the defined features in the feature list definition 515. The parking data storage 565 may communicate with further external sources 580 that provided information related to the defined features. Also, the parking data storage 565 may also store data associated with parking events from additional data sources 570. The data sources 570 may provide data related to parking events associated with the defined parking segments in the parking segments definitions 510. The training data provided by the parking data storage 565 may be used by the computing PtP module 525 for reevaluating the currently stored values for probabilities to park 520. The reevaluation of the current values for the probabilities to park may correspond to the correspondingly discussed processes in relation to FIGS. 2A, 2B, 3, and 4.

Figure 6:
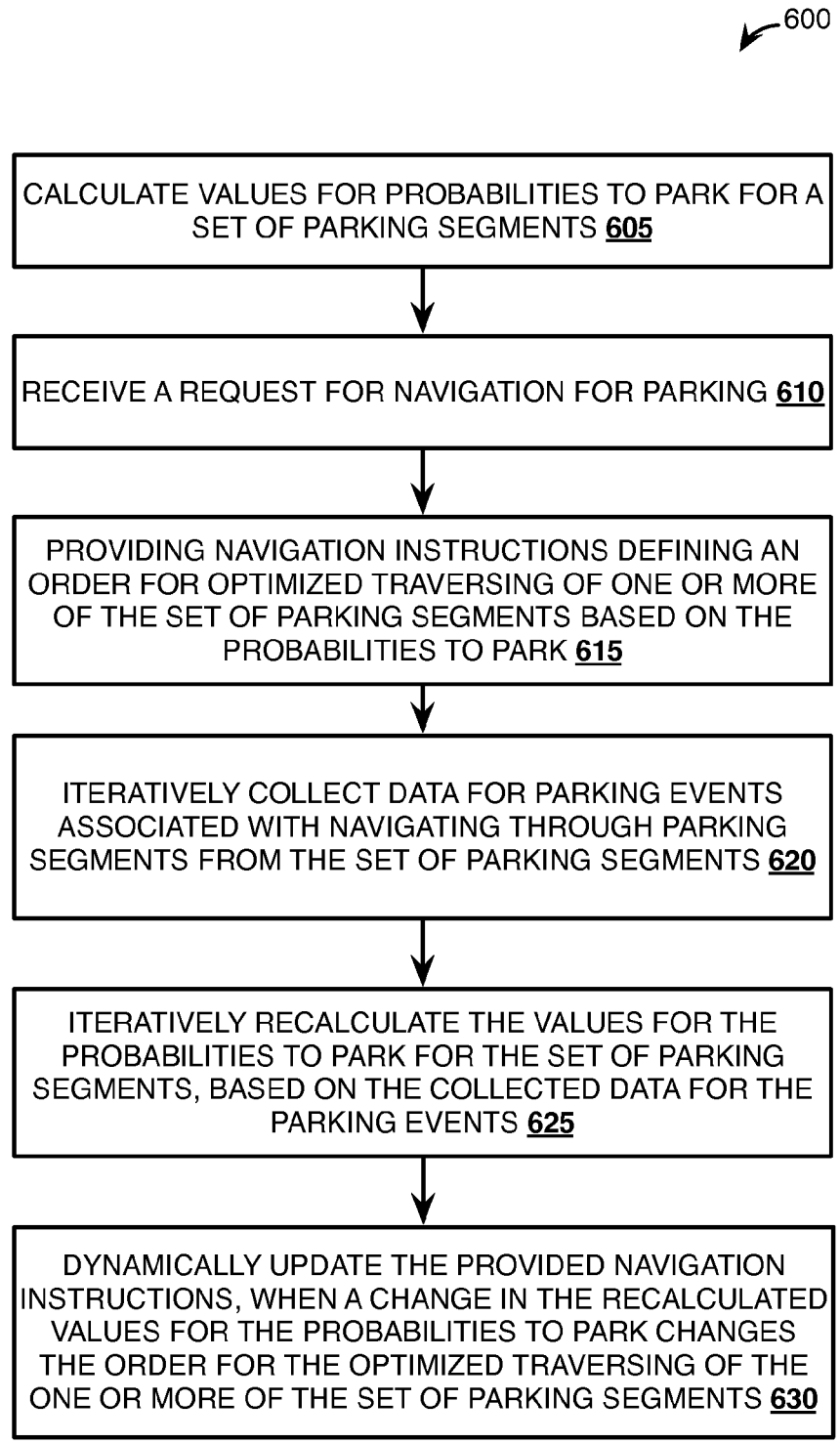
FIG. 6 is a flow diagram illustrating a process for dynamic update of navigation instructions, when a change in reevaluated current values for probabilities to park for parking segments result in a change in the optimized traversing order of the parking segments, according to one embodiment.

FIG. 6 is a flow diagram illustrating a process 600 for dynamic update of navigation instructions, when a change in reevaluated current values for probabilities to park for parking segments result in a change in the optimized traversing order of the parking segments, according to one embodiment. At 605, values for probabilities to park are calculated for a set of parking segments. The set of parking segments may be such as the defined set of parking segments at 205, FIG. 2A and at 250, FIG. 2B. The calculation of the values for probabilities to park may be such as the described determination of probability values in relation, for example, to FIG. 1, FIG. 2A and at 250, FIG. 2B. At 610, a request for navigation for parking is received. The request may define parking constraints. The request may be such as the request described in relation to FIG. 1, FIGS. 2A and 2B, FIGS. 3 and 4, and FIG. 5. At 615, navigation instructions are provided. The navigation instructions define an order for optimized traversing of one or more of the set of parking segments based on the calculated values for probabilities to park. The one or more of the set of parking segments may be determined based on the received request. The one or more of the set of parking segments comply with received constraints for parking. The constraints for parking and the definition of the one or more of the set of parking segments may correspond to the suggested process in relation to FIG. 3 and FIG. 4.

At 620, data for parking events are collected iteratively. The parking events are associated with navigation through parking segments from the set of parking segments. The navigation is performed based on determined optimized routes according to calculated values for the probabilities to park for the set of parking segments. The collected data may be such as the data 400, FIG. 4. Data may be collected from different source that may communicate information about parking results for parking events associated with provided navigation instructions. At 625, values for probabilities to park are recalculated iteratively. Whenever a certain amount of data are collected at 620, a reevaluation of the calculated values for the probabilities to park may be triggered. In such manner, the provided values for probabilities to park are kept updated and provide optimization on the route definition. The collection of data for parking events and an afterwards reevaluation of the values for the probabilities to park for the set of parking segments (625) may be repeated iteratively a number of times.

At 630, the provided navigation instructions based on the calculated values for the probabilities to park for the parking segments are dynamically updated, when a change in the recalculated values for the probabilities to park changes the order for the optimized traversing of the one or more of the set of parking segments. Based on the change in the recalculated values for the probabilities to park, the optimized route is re-determined. If the updated optimized route defines different navigation instructions compared to the instructions at 616, then updated navigation instructions are provided at 630 that correspond to the updated optimized route.

Figure 7:
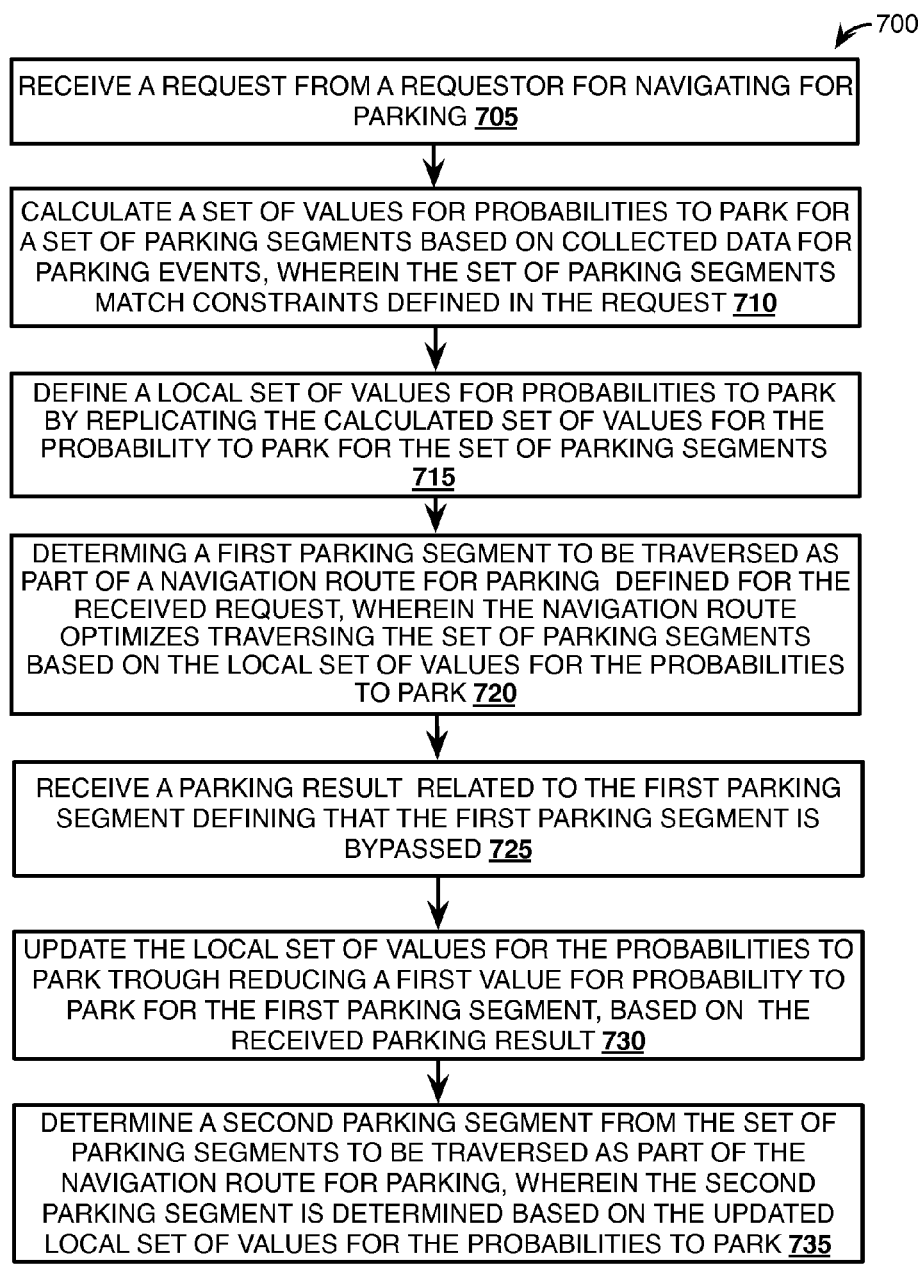
FIG. 7 is a block diagram illustrating a process for determining an optimized route for traversing parking segments while searching for parking based on a local set of values for probabilities to park defined for the parking segments, according to one embodiment.

FIG. 7 is a block diagram illustrating a process 700 for determining an optimized route for traversing parking segments while searching for parking based on a local set of values for probabilities to park defined for the parking segments, according to one embodiment. At 705 a request is received from a requestor for navigating for parking. The request may define parking constraints, such as the parking constraints 403, FIG. 4. The request may be such as the request described in relation to FIG. 1, FIGS. 2A and 2B, FIG. 3, FIG. 4, and FIG. 5. At 710, a set of values for probabilities to park is calculated for a set of parking segments based on collected data for parking events. The set of parking segments match defined constraints in the received request. The calculation of the set of values for the probabilities to park may be such as the described determination of values for probabilities to park in relation to FIG. 1, FIG. 2A, FIG. 2B, FIG. 5, and FIG. 6.

At 715, a local set of values for probabilities to park are defined. The local set of values for the probabilities to park is defined by replicating the calculated set of values for the probabilities to park at 710. At 720, a first parking segment is determined for traversing, as part of a navigation route for parking defined for the received request. The navigation route optimizes traversing the set of the parking segments based on the local set of values for the probabilities to park. At 725, a parking result is received. The parking result is related to the first parking segment and defines that the first parking segment is passed. Data for the parking result may be stored as a record, such as the records in data 400, FIG. 4. The data for the parking result may include data related to defined event features, time of the event, etc. Based on the received parking result, at 730, the local set of probabilities to park is updated. A first value for the probability to park for the first segment is changed. For example, the first value is reduced. The reduction may be with a reduction index, for example 0,5. At 735, a second parking segment from the set of parking segments is determined to be traversed as part of the navigation route for parking in response to the received request. The second parking segment is determined based on the updated local set of values for the probabilities to park, including the reduced value for the probability to park for the first parking segment.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
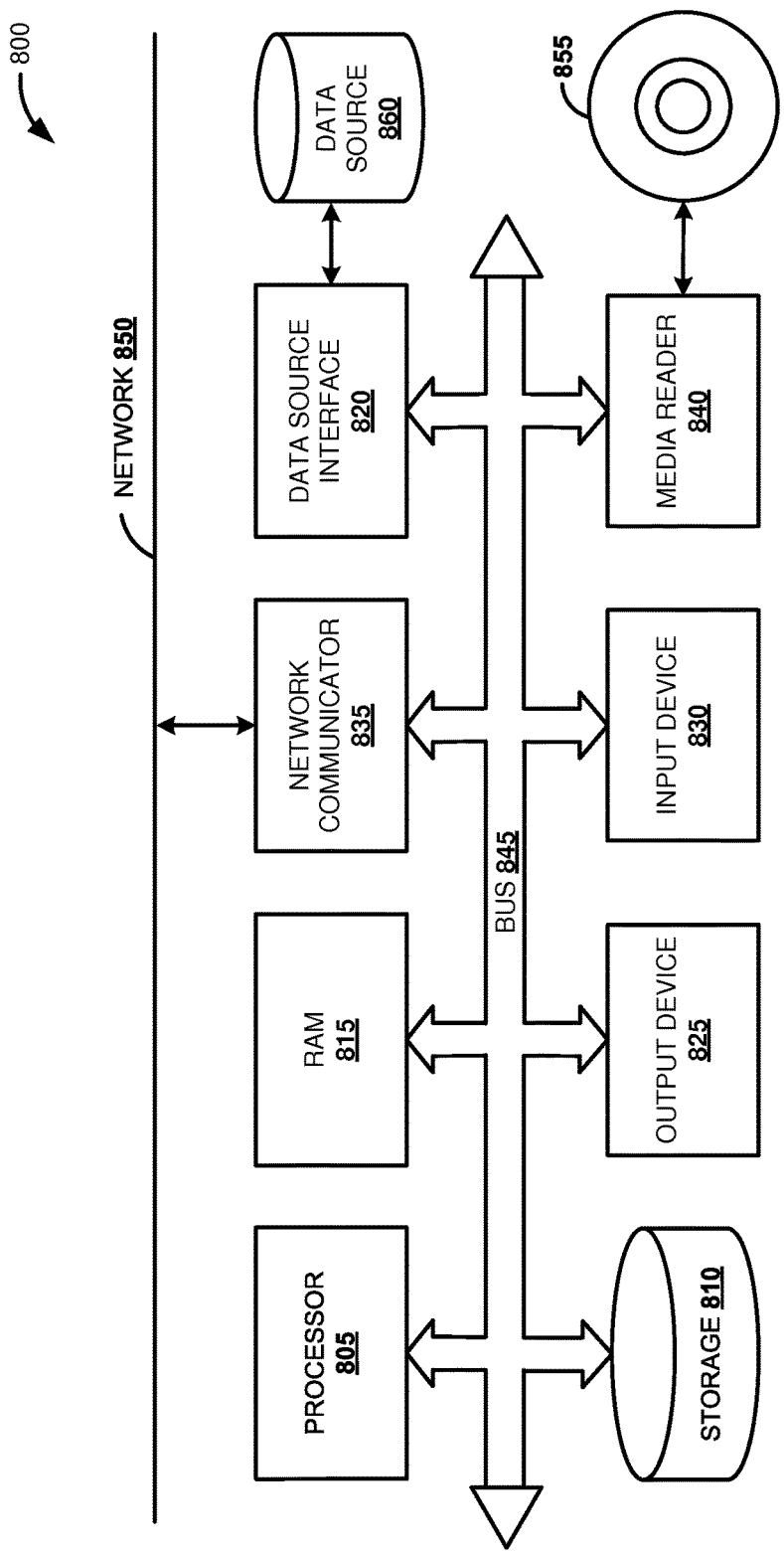
FIG. 8 is a block diagram illustrating an embodiment of a computing environment in which the techniques described for providing an optimized parking route for navigation when searching for parking can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a number of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data are not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments.

One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to provide optimized parking routes based on probability values, the method comprising:
   receiving an initial request defining constraints for searching for parking within a plurality of parking segments;
   determining a set of parking segments from the plurality of parking segments that correspond to the initial request for parking;
   determining a set of initial values for probabilities to park for the set of parking segments based on evaluation of data collected for parking events associated with the set of parking segments;
   determining a route traversing the set of parking segments from the plurality of parking segments in an optimized order according to the set of initial values for probabilities to park defined for the set of parking segments;
   providing navigation instructions according to the determined route for navigation during searching for parking; and
   based on collected parking data associated with the provided navigation instructions, reevaluating the set of initial values for probabilities to park for the set of parking segments.

2. The method of claim 1, further comprising:
   defining the plurality of parking segments to be associated correspondingly with a plurality of initial values for probabilities to park; and
   defining one or more features related to a probability to park at a parking segment from the plurality of parking segments.

3. The method of claim 2, wherein an initial value from the plurality of initial values defined for the plurality of parking segments is selected from a limited finite number of probability values.

4. The method of claim 2, further comprising:
   collecting the parking data for parking events associated with the provided navigation instructions for traversing the set of parking segments.

5. The method of claim 4, wherein collecting the parking data for the parking events further comprises:
   collecting traffic data for the parking events; and
   collecting additional data for the parking events associated with the one or more defined features.

6. The method of claim 4, further comprising:
   determining a plurality of current values for probabilities to park for the plurality of parking segments based on the reevaluated set of initial values for probabilities to park for the set of parking segments from the plurality of parking segments.

7. The method of claim 6, wherein the parking segments are determined from the plurality of the parking segments, and wherein determining the current values for probabilities to park for the parking segments further comprises:
   iteratively collecting data for the parking events associated with provided routes for navigation through parking segments from the plurality of parking segments;
   iteratively reevaluating the plurality of current values for probabilities to park based on the collected data;
   dynamically updating the plurality of current values for probabilities to park to determine updated plurality of current values for probabilities to park for the plurality of parking segments; and
   determining the current values for the probabilities to park for the parking segments based on the updated plurality of current values.

8. The method of claim 7, further comprising:
   based on the updated plurality of current values for probabilities to park, defining a local set of values for probabilities to park for a new set from the plurality of parking segments associated with a new request for searching for parking;
   receiving parking result data for a first determined segment from the new set of parking segments defining that the first determined segment is traversed without parking;
   updating the local set of values by reducing a first values for probability to park for the first determined segment; and
   according to the new request, determining a next parking segment for searching for parking from the new set of parking segments based on the updated local set of values for probabilities to park.

9. A computer system comprising:
   a processor;
   a memory in association with the processor storing instructions to:
      receive an initial request defining constraints for searching for parking within a plurality of parking segments;
      determine a set of parking segments from the plurality of parking segments that correspond to the initial request for parking;
      determine a set of initial values for probabilities to park for the set of parking segments based on evaluation of data collected for parking events associated with the set of parking segments;
      determine a route traversing the parking segments from the plurality of parking segments in an optimized order according to the set of initial values for probabilities to park defined for the set of parking segments;

provide navigation instructions according to the determined route for navigation during searching for parking; and based on collected parking data associated with the provided navigation instructions, reevaluate the set of initial values for probabilities to park for the set of parking segments.

10. The system of claim 9, wherein the parking segments are selected from the plurality of parking segments based on compliance with the parking constraints, and wherein the memory further stores instructions to:

define the plurality of parking segments to be associated correspondingly with a plurality of initial values for probabilities to park; and define one or more features related to a probability to park at a parking segment from the plurality of parking segments.

11. The system of claim 10, further comprising instructions to:

collect the parking data for parking events associated with the provided navigation instructions for traversing the set of parking segments, wherein the collected data comprise traffic data and additional data associated with the defined one or more features.

12. The system of claim 11, further comprising instructions to:

determine a plurality of current values for probabilities to park for the plurality of parking segments based on the reevaluated set of initial values for probabilities to park for the set of parking segments from the plurality of parking segments.

13. The system of claim 12, wherein the instructions to determine the current values for probabilities to park for the parking segments further comprise instructions to:

iteratively collect data for the parking events associated with provided routes for navigation through parking segments from the plurality of parking segments;

iteratively reevaluate the plurality of current values for probabilities to park based on the collected data;

dynamically update the plurality of current values for probabilities to park to determine updated plurality of current values for probabilities to park for the plurality of parking segments; and determine the current values for the probabilities to park for the parking segments based on the updated plurality of current values.

14. A non-transitory computer-readable medium storing instructions, which when executed cause a computer system to:

receive an initial request defining constraints for searching for parking within a plurality of parking segments;

determine a set of parking segments from the plurality of parking segments that correspond to the initial request for parking;

determine a set of initial values for probabilities to park for the set of parking segments based on evaluation of data collected for parking events associated with the set of parking segments;

determine a route traversing the parking segments from the plurality of parking segments in an optimized order according to the set of initial values for probabilities to park defined for the set of parking segments;

provide navigation instructions according to the determined route for navigation during searching for parking; and based on collected parking data associated with the provided navigation instructions reevaluate the set of initial values for probabilities to park for the set of parking segments.

15. The computer-readable medium of claim 14, wherein the parking segments are selected from a plurality of parking segments based on compliance with received parking constraints with the initial request for parking, and wherein the plurality of parking segments are defined to be associated correspondingly with a plurality of initial values for probabilities to park.

16. The computer-readable medium of claim 15, further storing instructions to:

define one or more features related to a probability to park at a parking segment from the plurality of parking segments;

collect the parking data for parking events associated with the provided navigation instructions for traversing the set of parking segments, wherein the collected data comprise traffic data and additional data associated with the defined one or more features.

17. The computer-readable medium of claim 16, further storing instructions to:

determine a plurality of current values for probabilities to park for the plurality of parking segments based on the reevaluated set of initial values for probabilities to park for the set of parking segments from the plurality of parking segments.

18. The computer-readable medium of claim 17, wherein the instructions to determine the current values for probabilities to park for the parking segments further storing instructions to:

iteratively collect data for the parking events associated with provided routes for navigation through parking segments from the plurality of parking segments;

iteratively reevaluate the plurality of current values for probabilities to park based on the collected data;

dynamically update the plurality of current values for probabilities to park to determine updated plurality of current values for probabilities to park for the plurality of parking segments; and determine the current values for the probabilities to park for the parking segments based on the updated plurality of current values.

* * * * *